(12) United States Patent
McDaniel et al.

(10) Patent No.: US 9,988,468 B2
(45) Date of Patent: Jun. 5, 2018

(54) METHODS OF PREPARING A CATALYST (71) Applicant: Chevron Phillips Chemical Company LP, The Woodlands, TX (US)

(72) Inventors: Max P. McDaniel, Bartlesville, OK (US); Eric D. Schwerdtfeger, Bartlesville, OK (US); Jeremy M. Praetorius, Bartlesville, OK (US); Alan L. Solenberger, Bartlesville, OK (US); Kathy S. Clear, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days. days.

(21) Appl. No.: 15/281,538

(22) Filed: Sep. 30, 2016

(65) Prior Publication Data
US 2018/0094087 A1    Apr. 5, 2018

(51) Int. Cl.
*C08F 110/02* (2006.01)
*C08F 10/02* (2006.01)

(52) U.S. Cl.
CPC ............ *C08F 110/02* (2013.01); *C08F 10/02* (2013.01)

(58) Field of Classification Search
None
See application file for complete search history.

(56) References Cited

U.S. PATENT DOCUMENTS

| | | |
|---|---|---|
| 2,503,913 A | 4/1950 | Kimberlin, Jr. et al. |
| 3,119,569 A | 1/1964 | Baricordi |
| 3,248,179 A | 4/1966 | Norwood |
| 3,622,521 A | 11/1971 | Hogan et al. |
| 3,780,011 A | 12/1973 | Pullukat et al. |
| | (Continued) | |

FOREIGN PATENT DOCUMENTS

| | | |
|---|---|---|
| EP | 0033953 A2 | 8/1981 |
| EP | 0085857 B1 | 8/1983 |
| | (Continued) | |

OTHER PUBLICATIONS

Bird, R. Byron, et al., "Dynamics of Polymeric Liquids," Fluid Mechanics, vol. 1, Second Edition, 1987, cover page, publishing page, pp. xiii-xviii, and 171-172, John Wiley & Sons, Inc.

(Continued)

*Primary Examiner* — Catherine S Branch
(74) *Attorney, Agent, or Firm* — Conley Rose, P.C.; Rodney B. Carroll; Chad E. Walter (57) ABSTRACT

A method of preparing a catalyst comprising a) contacting (i) a silica-support, (ii) an oxotitanium compound, (iii) a chromium-containing compound, and (iv) an optional solvent to form a first aqueous mixture comprising a pre-catalyst and a reaction media having from about 1 wt. % to about 99 wt. % water; b) thermally treating the pre-catalyst by heating to a temperature of from about 400° C. to about 1000° C. for a time period of from about 1 minute to about 24 hours to form the catalyst. A method of preparing a catalyst comprising contacting a hydrated support material comprising silica with a chromium-containing compound to form a first aqueous mixture comprising a chrominated support; contacting the first aqueous mixture comprising a chrominated support with a solution comprising (i) a solvent and (ii) an oxotitanium compound to form a second aqueous mixture comprising a pre-catalyst; and thermally treating the pre-catalyst to form the catalyst.

29 Claims, 1 Drawing Sheet

(56) References Cited

U.S. PATENT DOCUMENTS

| | | |
|---|---|---|
| 3,875,079 A | 4/1975 | Witt |
| 3,882,096 A | 5/1975 | Shida et al. |
| 3,887,494 A | 6/1975 | Dietz |
| 3,900,457 A | 8/1975 | Witt |
| 3,970,613 A | 7/1976 | Goldie et al. |
| 3,976,632 A | 8/1976 | Delap |
| 4,041,224 A | 8/1977 | Hoff et al. |
| 4,053,436 A | 10/1977 | Hogen et al. |
| 4,119,569 A | 10/1978 | Dietz |
| 4,169,926 A | 10/1979 | McDaniel |
| 4,190,457 A | 2/1980 | McDaniel |
| 4,218,345 A | 8/1980 | Hoff et al. |
| 4,247,421 A | 1/1981 | McDaniel et al. |
| 4,280,141 A | 7/1981 | McCann et al. |
| 4,294,724 A | 10/1981 | McDaniel |
| 4,296,001 A | 10/1981 | Hawley |
| 4,299,731 A | 11/1981 | McDaniel et al. |
| 4,312,967 A | 1/1982 | Norwood et al. |
| 4,345,055 A | 8/1982 | Hawley |
| 4,368,303 A | 1/1983 | McDaniel |
| 4,402,864 A | 9/1983 | McDaniel |
| 4,405,501 A | 9/1983 | Witt |
| 4,405,768 A | 9/1983 | McDaniel |
| 4,424,320 A | 1/1984 | McDaniel |
| 4,434,243 A | 2/1984 | Martin |
| 4,442,275 A | 4/1984 | Martin |
| 4,446,243 A | 5/1984 | Chester et al. |
| 4,501,885 A | 2/1985 | Sherk et al. |
| 4,547,557 A | 10/1985 | McDaniel |
| 4,588,790 A | 5/1986 | Jenkins, III et al. |
| 4,832,022 A | 5/1989 | Tjulkov et al. |
| 4,981,831 A | 1/1991 | Knudsen et al. |
| 5,115,053 A | 5/1992 | Knudsen et al. |
| 5,183,792 A | 2/1993 | Wang et al. |
| 5,231,066 A | 7/1993 | Rekers et al. |
| 5,284,926 A | 2/1994 | Benham et al. |
| 5,352,749 A | 10/1994 | DeChellis et al. |
| 5,426,082 A | 6/1995 | Marsden |
| 5,436,304 A | 7/1995 | Griffin et al. |
| 5,455,314 A | 10/1995 | Burns et al. |
| 5,478,898 A | 12/1995 | Standaert |
| 5,565,175 A | 10/1996 | Hottovy et al. |
| 5,575,979 A | 11/1996 | Hanson |
| 5,576,262 A | 11/1996 | Denton |
| 5,599,762 A | 2/1997 | Denton |
| 5,914,291 A | 6/1999 | Marsden et al. |
| 6,200,920 B1 | 3/2001 | Debras et al. |
| 6,239,235 B1 | 5/2001 | Hottovy et al. |
| 6,262,191 B1 | 7/2001 | Hottovy et al. |
| 6,423,663 B2 | 7/2002 | Debras |
| 6,482,901 B1 | 11/2002 | Debras |
| 6,489,428 B1 | 12/2002 | Debras et al. |
| 6,624,324 B2 | 9/2003 | Iwakura et al. |
| 6,657,023 B2 | 12/2003 | Bergmeister et al. |
| 6,707,498 B1 | 3/2004 | Toma et al. |
| 6,833,415 B2 | 12/2004 | Kendrick et al. |
| 6,855,781 B2 | 2/2005 | Bergmeister et al. |
| 7,088,394 B2 | 8/2006 | Rossi et al. |
| 7,262,259 B2 | 8/2007 | Katzen et al. |
| 7,375,169 B1 | 5/2008 | Smith et al. |
| 7,390,395 B2 | 6/2008 | Elomari |
| 7,700,516 B2 | 4/2010 | McDaniel et al. |
| 7,981,832 B2 | 7/2011 | McDaniel et al. |
| 8,183,173 B2 | 5/2012 | McDaniel et al. |
| 8,372,771 B2 | 2/2013 | Benham et al. |
| 9,023,967 B2 | 5/2015 | Yu et al. |
| 9,096,699 B2 | 8/2015 | McDaniel et al. |
| 2003/0007083 A1 | 1/2003 | Rossi et al. |
| 2004/0026324 A1 | 2/2004 | Luca |
| 2005/0153830 A1 | 7/2005 | Jensen et al. |
| 2005/0272886 A1 | 12/2005 | Cann et al. |
| 2007/0034549 A1 | 2/2007 | Elomari |
| 2013/0144017 A1 | 6/2013 | McDaniel et al. |
| 2014/0295178 A1 | 10/2014 | Watanabe et al. |
| 2015/0065667 A1 | 3/2015 | Cheng et al. |
| 2015/0203614 A1 | 7/2015 | Yu et al. |
| 2017/0145124 A1 | 5/2017 | Yu et al. |

FOREIGN PATENT DOCUMENTS

| | | |
|---|---|---|
| EP | 0088989 A2 | 9/1983 |
| EP | 0314385 A2 | 5/1989 |
| EP | 0337365 A2 | 10/1989 |
| EP | 0339571 A1 | 11/1989 |
| EP | 0439294 A1 | 7/1991 |
| EP | 0455444 A1 | 11/1991 |
| EP | 0589643 A1 | 3/1994 |
| EP | 0882743 B1 | 12/1998 |
| EP | 0882744 A1 | 12/1998 |
| EP | 1845110 A1 | 10/2007 |
| EP | 2172490 A1 | 4/2010 |
| EP | 2447290 A1 | 5/2012 |
| EP | 2606962 A1 | 6/2013 |
| GB | 1197069 | 7/1970 |
| GB | 1369485 | 10/1974 |
| GB | 1405721 | 9/1975 |
| GB | 1415649 | 11/1975 |
| GB | 1447605 | 8/1976 |
| GB | 1575419 | 9/1980 |
| WO | 9311173 A1 | 6/1993 |
| WO | 2002/02652 A2 | 1/2002 |
| WO | 03033550 A1 | 4/2003 |
| WO | 2004/052948 A1 | 6/2004 |
| WO | 2009042149 A2 | 4/2009 |
| WO | 2009042149 A3 | 4/2009 |
| WO | 2010034464 A1 | 4/2010 |
| WO | 2012040144 A1 | 3/2012 |
| WO | 2013081826 A1 | 6/2013 |
| WO | 2013082346 A2 | 6/2013 |
| WO | 2013082346 A3 | 6/2013 |

OTHER PUBLICATIONS

Bouh, Abdillahi Omar, et al., "Mono- and dinuclear silica-supported titanium(IV) complexes and the effect of TiOTi connectivity on reactivity," J. Am. Chem. Soc., 1999, pp. 7201-7210, vol. 121, American Chemical Society.

Conway, Steven J., et al., "Chromia/silica-titania cogel catalysts for ethene polymerisation," J. Chem. Soc., Faraday Trans., 1989, pp. 71-78, vol. 85, No. 1.

Conway, Steven J., et al., "Chromia/silica-titania cogel catalysts for ethene polymerisation," J. Chem. Soc., Faraday Trans., 1989, pp. 79-90, vol. 85, No. 1.

Conway, Steven J., et al., "Chromia/silica-titania cogel catalysts for ethene polymerisation," J. Chem. Soc., Faraday Trans., 1989, pp. 1841-1851, vol. 85, No. 7.

Ellison, Alan, et al., "Characterisation of cr/silica catalysts," J. Chem. Soc. Faraday Trans., 1993, pp. 4393-4395, vol. 89, No. 24.

Ellison, Alan, et al., "Characterisation of modified cr-silica catalysts," Journal of Molecular Catalysis, 1994, pp. 81-86, vol. 90, Elsevier Science B.V.

Filing receipt and specification for patent application entitled "Methods of Preparing a Catalyst," by Jeremy M. Praetorius, et al., filed Apr. 29, 2015 as U.S. Appl. No. 14/699,533.

Foreign communication from a related counterpart application—International Search Report and Written Opinion, PCT/US2008/011068, dated Mar. 23, 2009, 18 pages.

Foreign communication from a related counterpart application—International Preliminary Report on Patentability, PCT/US2008/011068, dated Mar. 30, 2010, 11 pages.

Foreign communication from a related counterpart application—Partial Search Report, Annex to Form PCT/ISA/206, PCT/US2012/067175, dated Apr. 12, 2013, 4 pages.

Foreign communication from a related counterpart application—International Search Report and Written Opinion, PCT/US2012/067175, dated Jun. 18, 2013, 23 pages.

Foreign communication from a related counterpart application—International Preliminary Report on Patentability, PCT/US2012/067175, dated Jun. 3, 2014, 16 pages.

(56) References Cited

OTHER PUBLICATIONS

Foreign communication from a related counterpart application—International Search Report and Written Opinion, PCT/US2012/064986, dated Jan. 25, 2013, 8 pages.
Foreign communication from a related counterpart application—International Preliminary Report on Patentability, PCT/US2012/064986, dated Jun. 3, 2014, 5 pages.
Hieber, C. A., et al., "Shear-rate-dependence modeling of polymer melt viscosity," Polymer Engineering and Science, Jul. 1992, pp. 931-938, vol. 32, No. 14.
Hieber, C. A., et al., "Some correlations involving the shear viscosity of polystyrene melts," Rheol Acta, 1989, pp. 321-332, vol. 28.
Mabilon, G., et al., "Copolymerisation ethylene-propylene par des catalyseurs a l'oxyde de chrome," Eur. Polym. J., 1985, pp. 245-249, vol. 21, No. 3, Pergamon Press Ltd., Great Britain.
McDaniel, M. P., et al., "The activation of the phillips polymerization catalyst," Journal of Catalysis, 1983, pp. 118-126, vol. 82, Academic Press, Inc.
Product Information, "LUDOX® SM-AS Colloidal Silica," 2005, W. R. Grace & Co.-Conn., 2 pages.
Pullukat, T. J., et al., "A chemical study of thermally activated chromic titanate on silica ethylene polymerization catalysts," Journal of Polymer Science: Polymer Chemistry Edition, 1980, pp. 2857-2866, vol. 18, John Wiley & Sons, Inc.
Pullukat, Thomas J., et al., "Titanium modified chromium catalysts for ethylene polymerization," Symposium on Transition Metal Catalysts Polymerization, Michigan Molecular Institute, Aug. 1981, pp. 697-712.
Rebenstorf, B., et al., "Influence of chromium concentration and addition of fluorine, titanium, or boron on the chromium species of the phillips catalyst: a quantitative evaluation," Langmuir, 1991, pp. 2160-2165, vol. 7, American Chemical Society.
Yu Youlu, et al., "SEC-MALS method for the determination of long-chain branching and long-chain branching distribution in polyethylene," Polymer, 2005, pp. 5165-5182, vol. 46, Elsevier Ltd.
Yu, Youlu, et al., "Size-exclusion chromatography coupled to multiangle light scattering detection of long-chain branching in polyethylene made with phillips catalyst," Journal of Polymer Science Part A: Polymer Chemistry, 2012, vol. 50, pp. 1166-1173, Wiley Periodicals, Inc.
Filing receipt and specification for patent application entitled "Long chain branched polymers and methods of making same," by Youlu Yu, et al., filed Oct. 20, 2016 as U.S. Appl. No. 15/298,540.
Filing receipt and specification for patent application entitled "Methods of Preparing a Catalyst," by Jeremy M. Praetorius, et al., filed Sep. 30, 2016 as U.S. Appl. No. 15/281,514.
Filing receipt and specification for patent application entitled "Methods of Preparing a Catalyst," by Jeremy M. Praetorius, et al., filed Sep. 18, 2015 as U.S. Appl. No. 14/858,512.
Foreign communication from a related counterpart application—International Search Report, PCT/US2016/029327, dated Aug. 24, 2016, 4 pages.
Office Action dated Jul. 28, 2016 (30 pages), U.S. Appl. No. 14/676,581, filed Apr. 1, 2015.
Office Action dated Jul. 5, 2016 (20 pages), U.S. Appl. No. 14/699,533, filed Apr. 29, 2015.
Notice of Allowance dated Aug. 16, 2016 (11 pages), U.S. Appl. No. 14/699,533, filed Apr. 29, 2015.
Foreign communication from a related counterpart application—International Search Report & Written Opinion, PCT/US2016/051902, dated Feb. 13, 2017, 14 pages.
Filing receipt and specification for patent application entitled "Methods of Preparing a Catalyst," by Eric Schwerdtfeger, et al., filed Apr. 24, 2017 as U.S. Appl. No. 15/495,116.
Office Action (Restriction Requirement) dated Aug. 14, 2017 (7 pages), U.S. Appl. No. 15/298,540, filed Oct. 20, 2016.
Office Action (Restriction Requirement) dated Aug. 11, 2017 (7 pages), U.S. Appl. No. 15/425,646, filed Feb. 6, 2017.
Notice of Allowance dated Jul. 24, 2017 (20 pages), U.S. Appl. No. 15/281,514, filed Sep. 30, 2016.
Notice of Allowance dated Aug. 28, 2017 (24 pages), U.S. Appl. No. 15/281,514, filed Sep. 30, 2016.
Office Action dated Nov. 8, 2017 (36 pages), U.S. Appl. No. 15/298,540, filed Oct. 20, 2016.
Notice of Allowance dated Nov. 15, 2017 (37 pages), U.S. Appl. No. 15/425,646, filed Feb. 6, 2017.
Niemanstverdriet, J.W., "Spectroscopy in Catalysis: An Introduction," Jul. 11, 2008, 3rd Edition, pp. 251-295, Section 9.5, WILEY-VCH.
Filing receipt and specification for patent application entitled "Methods of Preparing a Catalyst Utilizing Hydrated Reagents," by Max McDaniel, et al., filed Nov. 17, 2017 as U.S. Appl. No. 15/816,131.
Filing receipt and specification for patent application entitled "Methods of Preparing a Catalyst," by Max McDaniel, et al., filed Nov. 17, 2017 as U.S. Appl. No. 15/816,145.
Filing receipt and specification for provisional application entitled "Methods of Preparing a Catalyst," by Max McDaniel, at al., filed Dec. 29, 2016 as U.S. Appl. No. 62/440,188.
Filing Receipt and specification for patent application entitled "Methods of Preparing a Catalyse," by Max McDaniel, et al., filed Dec. 19, 2017 as U.S. Appl. No. 15/847,129.
Iler, Ralph K., "The Chemistry of Silica: Solubility, Polymerization, Colloid and Surface Properties and Biochemistry of Silica," 1979, 1 page, Wiley.
Foreign communication from a counterpart application—Invitation to Pay Additional Fees and Partial Search Report, PCT/US2017/053468, Feb. 9, 2018, 13 pages.
Foreign communication from a related application—International Search Report and Written Opinion, PCT/US2017/067485, Mar. 23, 2018, 11 pages.

METHODS OF PREPARING A CATALYST

TECHNICAL FIELD

The present disclosure relates to catalyst compositions. More specifically, the present disclosure relates to methods of preparing olefin polymerization catalyst compositions and polymers prepared from same.

BACKGROUND

Enhancements in preparation methods for olefin polymerization catalysts can reduce the costs associated with catalyst production and improve process economics. Thus, there is an ongoing need to develop new methods of preparing olefin polymerization catalysts.

SUMMARY

Disclosed herein is a method of preparing a catalyst comprising a) contacting (i) a silica-support, (ii) an oxotitanium compound, (iii) a chromium-containing compound, and (iv) an optional solvent to form a first aqueous mixture comprising a pre-catalyst and a reaction media having from about 1 wt. % to about 99 wt. % water; b) thermally treating the pre-catalyst by heating to a temperature of from about 400° C. to about 1000° C. for a time period of from about 1 minute to about 24 hours to form the catalyst.

Also disclosed herein is a method of preparing a catalyst comprising contacting a hydrated support material comprising silica with a chromium-containing compound to form a first aqueous mixture comprising a chrominated support, contacting the first aqueous mixture comprising a chrominated support with a solution comprising (i) a solvent and (ii) an oxotitanium compound to form a second aqueous mixture comprising a pre-catalyst; and thermally treating the pre-catalyst to form the catalyst.

Also disclosed herein is a method of preparing a catalyst comprising contacting a hydrated support material comprising silica with an oxotitanium compound to form a first aqueous mixture comprising a titanated support; contacting the first aqueous mixture comprising a titanated support with a chromium-containing compound to form a second aqueous mixture comprising a pre-catalyst; and thermally treating the pre-catalyst to form the catalyst.

Also disclosed herein is a method of preparing a catalyst comprising a) contacting (i) a silica support material comprising from about 0.1 wt. % to about 20 wt. % water, (ii) a solution comprising (1) a 2,4-pentadionate oxotitanium compound, (2) a solvent and (3) from about 0.1 wt. % to about 80 wt. % water based on the total weight of the solution and (iii) a chromium-containing compound to from a pre-catalyst wherein liquid present in (i), (ii), and (iii) comprise a reaction media; and b) thermally treating the pre-catalyst by heating to a temperature in the range of from about 500° C. to about 900° C. for a time period of from about 3 hours to about 12 hours to form a catalyst.

DETAILED DESCRIPTION

Disclosed herein are methods for the preparation of olefin polymerization catalysts and olefin polymerization catalyst supports. In an aspect of the present disclosure, the olefin polymerization catalyst support comprises a silica-titania (Si—Ti) support which is used to produce an olefin polymerization catalyst such as a chromium-silica-titania catalyst (Cr/Si—Ti). In an aspect of the present disclosure, the compositions and methodologies disclosed herein allow for the production of a chromium-silica-titania catalyst, hereinafter an olefin polymerization catalyst, in the presence of water.

In an aspect of the present disclosure, the olefin polymerization catalyst comprises titanium. The source of the titanium may be any titanium-containing compound capable of providing a sufficient amount of titanium to the olefin polymerization catalyst in the presence of an aqueous reaction media as described herein. In an aspect of the present disclosure, the titanium-containing compound is an oxotitanium compound. An example of an oxotitanium compound suitable for use in the present disclosure is characterized by the general formula $R^1R^2TiO$ wherein $R^1$ and $R^2$ are each independently a carboxylate, an alkoxide, a dicarboxylate, a tricarboxylate, a diketonate, an amino acid, an α-hydroxycarboxylate, an ammonium salt of a dicarboxylate, an ammonium salt of a tricarboxylate, or combinations thereof.

In an aspect, $R^1$ and $R^2$ are each independently a carboxylate, a dicarboxylate, an ammonium salt of a dicarboxylate, or an α-hydroxycarboxylate. Generally, the carboxylate can be a $C_1$ to $C_{20}$ carboxylate; or alternatively, a $C_1$ to $C_{10}$ carboxylate. In another aspect $R^1$ and $R^2$ can each independently be a dicarboxylate, such as oxalate, malonate, fumarate, or malate. In yet another aspect, $R^1$ and $R^2$ can each independently be an ammonium salt of a dicarboxylate, such as ammonium oxalate, ammonium malonate, ammonium fumarate, or ammonium malate. In still another aspect $R^1$ and $R^2$ can each independently be a tricarboxylate, such as citrate. In an aspect of the present disclosure, $R^1$ and $R^2$ are each independently acetate, a propionate, a butyrate, a pentanoate, a hexanoate, a heptanoate, an octanoate, a nonanoate, a decanoate, an undecanoate, or a dodecanoate; or alternatively, a pentanoate, a hexanoate, a heptanoate, an octanoate, a nonanoate, a decanoate, an undecanoate, or a dodecanoate. For example, $R^1$ and $R^2$ can each independently be formate, acetate, or a propionate. In yet another example, $R^1$ and $R^2$ can each independently be an oxalate. In yet another example, $R^1$ and $R^2$ can each independently be a diketonate. In another example, $R^1$ and $R^2$ can each independently be unsubstituted 2,4-pentadionate or a substituted 2,4-pentadionate. In an aspect of the present disclosure, the source of the titanium excludes a titanium tetraalkoxide.

The amount of titanium present in the olefin polymerization catalyst may range from about 0.01 wt. % to about 10 wt. % titanium by weight of the olefin polymerization catalyst, alternatively from about 0.5 wt. % to about 5 wt. %, alternatively from about 1 wt. % to about 4 wt. %, or alternatively from about 2 wt. % to about 4 wt. %. In another aspect of the present disclosure, the amount of titanium in the olefin polymerization catalyst may range from about 1 wt. % to about 5 wt. %. Herein, the percentage titanium refers to the final weight percent titanium associated with the olefin polymerization catalyst by total weight of the olefin polymerization catalyst after all processing steps (e.g., after final activation via calcination).

In an aspect of the present disclosure, the olefin polymerization catalyst comprises chromium. The source of the chromium may be any chromium-containing compound capable of providing a sufficient amount of chromium to the olefin polymerization catalyst. For example, the chromium-containing compound may be a water-soluble compound or a hydrocarbon-soluble compound. Examples of water-soluble chromium compounds include chromium trioxide, chromium acetate, chromium nitrate, or combinations thereof. Examples of hydrocarbon-soluble chromium compounds include tertiary butyl chromate, a diarene chromium (0) compound, biscyclopentadienyl chromium (II), chromium (III) acetylacetonate, or combinations thereof. In one aspect of the present disclosure, the chromium-containing compound may be a chromium (II) compound, a chromium (III) compound, or combinations thereof. Suitable chromium (III) compounds include, but are not limited to, chromium carboxylates, chromium naphthenates, chromium halides, chromium sulfate, chromium nitrate, chromium dionates, or combinations thereof. Specific chromium (III) compounds include, but are not limited to, chromium (III) sulfate, chromium (III) chloride, chromium (III) nitrate, chromic bromide, chromium (III) acetylacetonate, and chromium (III) acetate. Suitable chromium (II) compounds include, but are not limited to, chromous chloride, chromous bromide, chromous iodide, chromium (II) sulfate, chromium (II) acetate, or combinations thereof.

The amount of chromium present in the olefin polymerization catalyst may range from about 0.01 wt. % to about 10 wt. % chromium by weight of the olefin polymerization catalyst, alternatively from about 0.5 wt. % to about 5 wt. %, alternatively from about 1 wt. % to about 4 wt. %, or alternatively from about 2 wt. % to about 4 wt. %. In another aspect of the present disclosure, the amount of chromium present in the olefin polymerization catalyst may range from about 1 wt. % to about 5 wt. %. Herein, the percentage chromium refers to the final weight percent chromium associated with the olefin polymerization catalyst by total weight of the olefin polymerization catalyst after all processing steps (e.g., after final activation via calcination).

In an aspect of the present disclosure, the olefin polymerization catalyst comprises a silica-support. A silica-support suitable for use in the present disclosure may have a surface area and pore volume effective to provide for the production of an active olefin polymerization catalyst. In an aspect of the present disclosure, the silica-support possesses a surface area in the range of from about 100 $m^2$/gram to about 1000 $m^2$/gram, alternatively from about 250 $m^2$/gram to about 1000 $m^2$/gram, alternatively from about 250 $m^2$/gram to about 700 $m^2$/gram, alternatively from about 250 $m^2$/gram to about 600 $m^2$/gram, or alternatively greater than 250 $m^2$/gram. The silica-support may be further characterized by a pore volume of greater than about 0.9 $cm^3$/gram, alternatively greater than about 1.0 $cm^3$/gram, or alternatively greater than about 1.5 $cm^3$/gram. In an aspect of the present disclosure, the silica-support is characterized by a pore volume ranging from about 1.0 $cm^3$/gram to about 2.5 $cm^3$/gram. The silica-support may be further characterized by an average particle size of from about 10 microns to about 500 microns, alternatively about 25 microns to about 300 microns, or alternatively about 40 microns to about 150 microns. Generally, the average pore size of the silica-support ranges from about 10 Angstroms to about 1000 Angstroms. In one aspect of the present disclosure, the average pore size of the silica-support material is in the range of from about 50 Angstroms to about 500 Angstroms, while in yet another aspect of the present disclosure the average pore size ranges from about 75 Angstroms to about 350 Angstroms.

The silica-support may contain greater than about 50 percent (%) silica, alternatively greater than about 80% silica, alternatively greater than about 95% silica by weight of the silica-support. The silica-support may be prepared using any suitable method, for example the silica-support may be prepared synthetically by hydrolyzing tetrachlorosilane ($SiCl_4$) with water or by contacting sodium silicate with a mineral acid. An example of silica-support suitable for use in this disclosure includes without limitation ES70 which is a silica-support material with a surface area of 300 $m^2$/gram, and a pore volume of 1.6 $cm^3$/gram that is commercially available from PQ Corporation. The silica-support may include additional components that do not adversely affect the catalyst, such as zirconia, alumina, thoria, magnesia, fluoride, sulfate, phosphate, or mixtures thereof.

The silica-support may be present in the olefin polymerization catalyst in an amount of from about 50 weight percent (wt. %) to about 99 wt. %, or alternatively from about 80 wt. % to about 99 wt. %. Herein the percentage of silica-support refers to the final weight percent of silica-support associated with the olefin polymerization catalyst by total weight of the olefin polymerization catalyst after all processing steps (e.g., after final activation via calcination).

Disclosed herein are methods of preparing a catalyst composition comprising contacting one or more catalyst components. Various sequences for contacting of the catalyst components are also disclosed herein. It is contemplated that other sequences for the contacting of the catalyst components may also produce a catalyst of the type disclosed herein. Consequently, in an aspect of the present disclosure the catalyst components (e.g., oxotitanium compound, chromium-containing compound, silica) may be contacted in any order or fashion to produce a catalyst of the type disclosed herein.

In an aspect of the present disclosure, a method for preparation of an olefin polymerization catalyst of the type disclosed herein comprises contacting an oxotitanium compound (e.g., $R^1R^2TiO$) with a silica-support to form a titanated support. In an aspect of the present disclosure, preparation of an olefin polymerization catalyst of the type disclosed herein excludes drying of the silica-support prior to contact of the silica-support with any other catalyst component. Consequently, a silica-support suitable for use in the present disclosure may be a "hydrated" silica-support containing greater than about 1 wt. % water by total weight of the silica-support. For example, the silica-support may contain from about 0.1 wt. % to about 20 wt. % water, alternatively from about 0.1 wt. % to about 15 wt. % water, or alternatively from about 0.1 wt. % to about 10 wt. % water. Similarly, the oxotitanium compound may be a component of an aqueous solution when contacted with the hydrated silica. Upon contacting the oxotitanium compound and the silica-support, the resulting first aqueous mixture comprising the titanated support and water may be stirred at ambient temperature for a time period ranging from about 5 minutes to about 30 hours, alternatively from about 15 minutes to about 12 hours, or alternatively from about 30 minutes to about 5 hours.

In an aspect of the present disclosure, the method for preparation of an olefin polymerization catalyst of the type disclosed herein comprises contacting the first aqueous mixture (comprising water and the titanated support) with a chromium-containing compound to form a second aqueous mixture comprising water and a pre-catalyst (e.g., a chrominated, titanated support). It is contemplated that the chromium-containing compound may be a component of an aqueous solution when contacted with the first aqueous mixture (comprising the titanated support and water). In an aspect of the present disclosure, the second aqueous mixture comprising the water and the pre-catalyst (e.g., a chrominated, titanated support) is then treated to remove the water, for example via a thermal treatment. For example, the second aqueous mixture comprising water and the pre-catalyst (e.g., a chrominated, titanated support) may be dried at temperatures ranging from about 25° C. to about 300° C., alternatively from about 50° C. to about 200° C., or alternatively from about 80° C. to about 150° C. to form a dried pre-catalyst. In one aspect of the present disclosure, the dried pre-catalyst may then be activated via a calcination step by heating it in an oxidizing environment to produce the olefin polymerization catalyst. For example, the dried pre-catalyst may be calcined in the presence of air at a temperature in the range of from about 400° C. to about 1,000° C., alternatively from about 500° C. to about 900° C., alternatively from about 500° C. to about 850° C. and for a time period of from about 1 min to about 24 hours, alternatively from about 1 minute to about 10 hours, alternatively from about 1 hour to about 24 hours, alternatively from about 1 hour to about 12 hours, alternatively from about 3 hours to about 12 hours, alternatively from about 20 min to about 5 hours, or alternatively from about 1 hour to about 3 hours to produce the olefin polymerization catalyst.

In an aspect of the present disclosure, a method for preparation of an olefin polymerization catalyst of the type disclosed herein comprises contacting a chromium-containing compound with a silica-support to form a first aqueous mixture comprising a chrominated support and water. In such an aspect of the present disclosure, the silica-support may be a hydrated silica. Similarly, the chromium-containing compound may be a component of an aqueous solution when contacted with the hydrated silica. Upon addition of the chromium-containing compound to the silica-support the resulting first aqueous mixture comprising the chrominated support and water may be stirred at ambient temperature for a time period ranging from about 5 minutes to about 30 hours, alternatively from about 15 minutes to about 12 hours, or alternatively from about 30 minutes to about 5 hours.

In an aspect of the present disclosure, the method for preparation of an olefin polymerization catalyst of the type disclosed herein comprises contacting the first aqueous mixture (comprising the chrominated support and water) with an oxotitanium compound (e.g., $R^1R^2TiO$) to form a second aqueous mixture comprising water and a pre-catalyst (e.g., a chrominated, titanated support). It is contemplated that the oxotitanium compound (e.g., $R^1R^2TiO$) may be a component of an aqueous solution when contacted with the first aqueous mixture (comprising the chrominated support and water).

In an aspect of the present disclosure, the second aqueous mixture comprising water and the pre-catalyst (e.g., a chrominated, titanated support) is then treated to remove the water, for example via a thermal treatment. For example, the second aqueous mixture comprising water and the pre-catalyst (e.g., a chrominated, titanated support) may be dried at temperatures ranging from about 25° C. to about 300° C., alternatively from about 50° C. to about 200° C., or alternatively from about 80° C. to about 150° C. to form a dried pre-catalyst. In one aspect of the present disclosure, the dried pre-catalyst may then be activated via a calcination step by heating it in an oxidizing environment to produce the olefin polymerization catalyst. For example, the dried pre-catalyst may be calcined in the presence of air at a temperature in the range of from about 400° C. to about 1,000° C., alternatively from about 500° C. to about 900° C., or alternatively from about 500° C. to about 850° C. and for a time period of from about 1 min to about 24 hours, alternatively from about 1 minute to about 10 hours, alternatively from about 1 hour to about 24 hours, alternatively from about 1 hour to about 12 hours, alternatively from about 3 hours to about 12 hours, alternatively from about 20 min to about 5 hours, or alternatively from about 1 hour to about 3 hours to produce the olefin polymerization catalyst.

In an aspect of the present disclosure, a method for preparation of an olefin polymerization catalyst of the type disclosed herein comprises contacting an oxotitanium compound (e.g., $R^1R^2TiO$) with a silica-support and a chromium-containing compound to form a first aqueous mixture comprising water and a pre-catalyst (e.g., a chrominated, titanated support). In an aspect of the present disclosure, the silica-support is a hydrated silica. Similarly, the oxotitanium compound and/or chromium-containing compound may be a component of an aqueous solution when contacted with the hydrated silica. Upon contacting of the silica-support, the chromium-containing compound, and the oxotitanium compound, the first aqueous mixture comprising water and the pre-catalyst (e.g., a chrominated, titanated support) may be stirred at ambient temperature for a time period ranging from about 5 minutes to about 30 hours, alternatively from about 15 minutes to about 12 hours, or alternatively from about 30 minutes to about 5 hours.

In an aspect of the present disclosure, the first aqueous mixture comprising water and the pre-catalyst (e.g., a chrominated, titanated support) is then treated to remove the water, for example via a thermal treatment. For example, the first aqueous mixture comprising water and the pre-catalyst (e.g., a chrominated, titanated support) may be dried at temperatures ranging from about 25° C. to about 300° C., alternatively from about 50° C. to about 200° C., or alternatively from about 80° C. to about 150° C. to form a dried pre-catalyst. In one aspect of the present disclosure, the dried pre-catalyst may then be activated via a calcination step by heating it in an oxidizing environment to produce the olefin polymerization catalyst. For example, the dried pre-catalyst may be calcined in the presence of air at a temperature in the range of from about 400° C. to about 1,000° C., alternatively from about 500° C. to about 900° C., or alternatively from about 500° C. to about 850° C. and for a time period of from about 1 min to about 24 hours, alternatively from about 1 minute to about 10 hours, alternatively from about 1 hour to about 24 hours, alternatively from about 1 hour to about 12 hours, alternatively from about 3 hours to about 12 hours, alternatively from about 20 min to about 5 hours, or alternatively from about 1 hour to about 3 hours to produce the olefin polymerization catalyst.

In an optional aspect of the present disclosure, contacting of one or more components used to prepare the olefin polymerization catalyst is carried out in the presence of water as well as an additional solvent, for example water combined with a non-aqueous solvent. In an aspect, the solvent comprises alcohols, ketones, aliphatic hydrocarbons, aromatic hydrocarbons, halocarbons, ethers, acetonitrile, esters, or combinations thereof. Alternatively, the solvent comprises alcohols, ketones, esters, or combinations thereof.

Aliphatic hydrocarbons which can be useful as a solvent include $C_3$ to $C_{20}$ aliphatic hydrocarbons; alternatively, $C_4$ to $C_{15}$ aliphatic hydrocarbons; or alternatively, $C_5$ to $C_{10}$ aliphatic hydrocarbons. The aliphatic hydrocarbons can be cyclic or acyclic and/or can be linear or branched, unless otherwise specified. Non-limiting examples of suitable acyclic aliphatic hydrocarbon solvents that can be utilized singly or in any combination include propane, iso-butane, n-butane, butane (n-butane or a mixture of linear and branched $C_4$ acyclic aliphatic hydrocarbons), pentane (n-pentane or a mixture of linear and branched $C_5$ acyclic aliphatic hydrocarbons), hexane (n-hexane or mixture of linear and branched $C_6$ acyclic aliphatic hydrocarbons), heptane (n-heptane or mixture of linear and branched $C_7$ acyclic aliphatic hydrocarbons), octane (n-octane or a mixture of linear and branched $C_8$ acyclic aliphatic hydrocarbons), and combinations thereof. Aromatic hydrocarbons which can be useful as a solvent include $C_6$ to $C_{20}$ aromatic hydrocarbons; or alternatively, $C_6$ to $C_{10}$ aromatic hydrocarbons. Non-limiting examples of suitable aromatic hydrocarbons that can be utilized singly or in any combination in the present disclosure include benzene, toluene, xylene (including ortho-xylene, meta-xylene, para-xylene, or mixtures thereof), ethylbenzene, or combinations thereof.

Halogenated aliphatic hydrocarbons which can be useful as a solvent include $C_1$ to $C_{15}$ halogenated aliphatic hydrocarbons; alternatively, $C_1$ to $C_{10}$ halogenated aliphatic hydrocarbons; or alternatively, $C_1$ to $C_5$ halogenated aliphatic hydrocarbons. The halogenated aliphatic hydrocarbons can be cyclic or acyclic and/or can be linear or branched, unless otherwise specified. Non-limiting examples of suitable halogenated aliphatic hydrocarbons which can be utilized include methylene chloride, chloroform, carbon tetrachloride, dichloroethane, trichloroethane, and combinations thereof; alternatively, methylene chloride, chloroform, dichloroethane, trichloroethane, and combinations thereof. Halogenated aromatic hydrocarbons which can be useful as a solvent include $C_6$ to $C_{20}$ halogenated aromatic hydrocarbons; or alternatively, $C_6$ to $C_{10}$ halogenated aromatic hydrocarbons. Non-limiting examples of suitable halogenated aromatic hydrocarbons include chlorobenzene, dichlorobenzene, and combinations thereof.

Esters, ketones, or alcohols which can be useful as a solvent include $C_1$ to $C_{20}$ esters, ketones, or alcohols; alternatively, $C_1$ to $C_{10}$ esters, ketones, aldehydes, or alcohols; or alternatively, $C_1$ to $C_5$ esters, ketones, aldehydes, or alcohols. Non-limiting examples of suitable esters which can be utilized as a solvent include ethyl acetate, propyl acetate, butyl acetate, isobutyl isobutyrate, methyl lactate, ethyl lactate, and combinations thereof. Non-limiting examples of suitable ketones which can be utilized as a solvent include acetone, ethyl methyl ketone, methyl isobutyl ketone, and combinations thereof. Non-limiting examples of suitable alcohols which can be utilized as a solvent include methanol, ethanol, propanol, isopropanol, n-butanol, isobutanol, pentanol, hexanol, heptanol, octanol, benzyl alcohol, phenol, cyclohexanol, and the like, or combinations thereof. In an aspect, the solvent comprises methanol, ethanol, isopropanol, propanol, butanol, acetone, methylethylketone, ethyl acetate, heptane, or combinations thereof.

In an aspect of the present disclosure, an additional solvent further comprises a polyol or polyhydric alcohol (e.g., a polyalcohol or polyol). In some aspects, the polyol can comprise any hydrocarbon having at least 2 alcohol groups (or alternatively called hydroxy groups); alternatively, at least 3 alcohol groups; or alternatively, at least 4 alcohol groups. In an aspect, the polyol is an aliphatic hydrocarbon comprising at least two alcohol groups. In some aspects, the polyol is a glycol, a sugar, a reduced sugar, an oligomer of a glycol, or combinations thereof.

In an aspect, the polyol can be an aliphatic polyol such as ethylene glycol, diethylene glycol, triethylene glycol, tetraethylene glycol, tripropylene glycol, polyethylene glycols with a molecular weight of from 106 to 8500, polyethylene glycols with a molecular weight of from 400 to 2000, 1,2-propanediol, 1,3-propanediol, 1,2-butanediol, 1,3-butanediol, 1,4-butanediol, 1,5-pentanediol, neopentyl glycol, 1,2-hexanediol, 1,6-hexanediol, 1,2-octanediol, 1,8-octanediol, 1,2-decanediol, 1,10-decanediol, glycerol, 2,2-dimethylolpropane, trimethylolethane, trimethylolpropane, pentaerythritol, dipentaerythritol, sorbitol, 1,2,4-butanetriol, 2,2,4-trimethyl-1,3-pentanediol, or combinations thereof.

In an aspect, the polyol can be a cyclic aliphatic polyol such as 1,2-cyclopentanediol, 1,3-cyclopentanediol, 1,2-cyclohexanediol, 1,3-cyclohexanediol, 1,4-cyclohexanediol, 1,2-cyclohexanedimethanol, 1,4-cyclohexanedimethanol, bis(4-hydroxycyclohexyl)methane, 2,2-bis(4-hydroxy-cyclohexyl)propane, or any combination thereof.

In an aspect, the polyol can be an aralkyl polyol such as 1-phenyl-1,2-ethanediol, 1,2-benzenedimethanol, 1,3-benzene-di-methanol, 1,4-benzene-dimethanol, or mixtures thereof. In an aspect, the polyol can be an aromatic polyol such as 1,2-benzenediol (pyrocatechol), 1,3-benzenediol (resorcinol), 1,4-benzenediol, methyl catechol, methyl resorcinol, 1,2,4-benzenetriol, 2-hydroxybenzylalcohol, 3-hydroxybenzylalcohol, 4-hydroxybenzylalcohol, 3,5-dihydroxybenzylalcohol, 2-(2-hydroxyphenyl)ethanol, 2-(3-hydroxy-phenyl)-ethanol, 2-(4-hydroxyphenyl)-ethanol, 2-phenyl-1,2-propanediol or mixtures thereof.

In an aspect, the polyol is a sugar alcohol which refers to the hydrogenated forms of the aldoses or ketoses of a sugar. For example, glucitol, also known as sorbitol, has the same linear structure as the chain form of glucose, but the aldehyde (—CHO) group is replaced with a —CH2OH group. Other common sugar alcohols include the monosaccharides erythritol and xylitol and the disaccharides lactitol and maltitol.

Generally, sugar alcohols can be characterized by the general formula HO—$CH_2$—(CH—OH)$_n$—$CH_2$—OH, wherein n is typically from 1 to 22. For example, when n=2, the sugar alcohol can be erythritol, threitol, etc. For example, when n=3, the sugar alcohol can be arabitol, xylitol, ribitol, etc. For example, when n=4, the sugar alcohol can be mannitol, sorbitol, etc. The most common sugar alcohols have 5 or 6 carbon atoms in their structure; wherein n is 3 or 4, respectively. In an aspect, the sugar alcohol comprises mannitol, sorbitol, arabitol, threitol, xylitol, ribitol, galactitol, fruitol, iditol, inositol, volemitol, isomalt, malitol, lactitol, or combinations thereof.

In an aspect, the polyol comprises ethylene glycol, diethylene glycol, triethylene glycol, tetraethylene glycol, tripropylene glycol, polyethylene glycols with a molecular weight of from 106 to 1000, 1,2-propanediol, 1,3-propanediol, 1,2-butanediol, 1,3-butanediol, 1,4-butanediol, 1,5-pentanediol, neopentyl glycol, 1,2-hexanediol, 1,6-hexanediol, 1,2-cyclohexanediol, 1,4-cyclohexanediol, 1,2-octanediol, 1,8-octanediol, 1,2-decanediol, 1,10-decanediol, glycerol, 2,2-dimethylolpropane, trimethylolethane, trimethylolpropane, pentaerythritol, dipentaerythritol, sorbitol, 1,2,4-butanediol, 2,2,4-trimethyl-1,3-pentanediol, 1-phenyl-1,2-ethanediol, 1,2-benzenediol (pyrocatechol), 1,3-benzenediol (resorcinol), 1,4-benzenediol, methyl catechol, methyl resorcinol, 1,2,4-benzenetriol, 2-hydroxybenzylalcohol, 3-hydroxybenzylalcohol, 4-hydroxybenzylalcohol, 3,5-dihydroxybenzylalcohol, 1,2-benzenedimethanol, 1,3-benzenedimethanol, 1,4-benzenedimethanol, 2-(2-hydroxyphenyl)ethanol, 2-(3-hydroxyphenyl)ethanol, 2-(4-hydroxyphenyl)ethanol, 2-phenyl-1,2-propanediol, bisphenol A (2,2-di(4-hydroxyphenyl)propane), bisphenol F (bis(4-hydroxyphenyl)methane), bisphenol S (4,4'-dihydroxydiphenylsulfone), bisphenol Z (4,4'-cyclohexylidenebisphenol), bis(2-hydroxyphenyl)methane, or combinations thereof. In an aspect, the polyol is selected from the group consisting of ethylene glycol, glycerol, propylene glycol, butane glycol, lactic acid or combinations thereof.

In some aspects, polyols such as glycols, glycol mono- and di-esters, glycerol and glycerates are added to the solvent to further reduce HRVOC emissions. The use of polyols in an olefin polymerization catalyst preparation is described in more detail in U.S. patent application Ser. No. 14/699,533 entitled "Methods of Preparing a Catalyst" which is incorporated by reference herein in its entirety.

In some aspects of the present disclosure, any contacting of the olefin polymerization catalyst components may be carried out in the presence of a reaction media. Specifically, the liquid associated with each component utilized in preparation of the olefin polymerization catalyst (e.g., water associated with the hydrated silica, the oxotitanium compound, the chromium-containing compound, etc.) and optionally an added solvent (e.g., a non-aqueous solvent) may form the reaction media in each contacting step described herein. In an aspect, the reaction media excludes any solid component utilized in the preparation methodology disclosed herein (e.g., excludes the silica support and any solids associated therewith). In some aspects, the sum of an amount of water present in any reaction media formed during preparation of the olefin polymerization catalyst is from about 1 wt. % to about 99 wt. % based on the total weight of the reaction media (e.g., all liquid components including water and any non-aqueous liquids such as one or more optional organic solvents), alternatively from about 1 wt. % to about 50 wt. %, alternatively from about 1 wt. % to about 20 wt. %, or alternatively from about 1 wt. % to about 10 wt. %. In an aspect of the present disclosure, the reaction media formed during one or more contacting steps performed during preparation of the olefin polymerization catalyst (e.g., the liquid components of a mixture comprising the titanated support, the liquid components of a mixture comprising the chrominated support, the liquid components of a mixture comprising the pre-catalyst, etc.) may contain greater than about 1 wt. % water, alternatively greater than about 5 wt. %, alternatively greater than about 10 wt. %, alternatively greater than about 20 wt. %, alternatively greater than about 30 wt. %, alternatively greater than about 40 wt. %, alternatively greater than about 50 wt. %, alternatively greater than about 60 wt. %, alternatively greater than about 70 wt. %, alternatively greater than about 80 wt. %, or alternatively greater than about 90 wt. % water based on the total weight of the reaction media, where the water may originate from one or more components used to form the mixture. In another aspect, an anhydrous reaction media (e.g., 100% organic media) is excluded as a component for the preparation of an olefin polymerization catalyst of the type disclosed herein.

During catalyst production, materials such as highly reactive volatile organic compounds (HRVOC) may be emitted. HRVOCs play a role in the formation of ozone in ozone nonattainment areas, i.e., areas that do not meet the Environmental Protection Agency's air quality standards for ground-level ozone. In an aspect of the present disclosure, an olefin polymerization catalyst prepared as disclosed herein results in a reduction in the level of HRVOCs produced during the olefin polymerization catalyst preparation. For example, the HRVOCs may comprise hydrocarbons, aromatic compounds, alcohols, ketones, or combinations thereof. In an aspect of the present disclosure, the HRVOCs comprise alkenes, alternatively propylene, butene, ethylene, or combinations thereof. Olefin polymerization catalysts produced as disclosed herein may be characterized by HRVOC emissions that are reduced by from about 50% to about 99% when compared to the emissions from an otherwise similar olefin polymerization catalyst prepared in the absence of an oxotitanium compound. Alternatively, emissions of HRVOCs from olefin polymerization catalysts prepared as disclosed herein are reduced by greater than about 50%, alternatively greater than about 75%, alternatively greater than about 90%, or alternatively greater than about 99% wherein compared to an otherwise similar olefin polymerization catalyst prepared in the absence of an oxotitanium compound (e.g., an otherwise similar olefin polymerization catalyst prepared in the presence of a Ti(isopropoxide)$_4$). In an aspect of the present disclosure, HRVOCs emissions during preparation of olefin polymerization catalysts of the type disclosed herein are less than about 2 wt. % based on the total weight of the olefin polymerization catalyst, alternatively less than about 1 wt. %, alternatively less than about 0.5 wt. %, or alternatively less than about 0.1 wt. %. In an aspect of the present disclosure, the HRVOC is propylene and the olefin polymerization catalyst production process has emissions of from about 50 wt. % to about 1 wt. % based on the weight percent of titanium in the olefin polymerization catalyst, alternatively less than about 20 wt. %, alternatively less than about 10 wt. %, or alternatively less than about 1 wt. %. In an aspect, the oxotitanium compound used in preparation of the olefin polymerization catalyst has a carbon:oxygen ratio of from about 0.3 to about 3.0, alternatively from about 0.5 to about 3.5, or alternatively from about 1.0 to about 3.0. In some aspects, the oxotitanium compound used in preparation of an olefin polymerization catalyst of the type disclosed herein has a carbon:oxygen ratio of greater than about 0.5.

The olefin polymerization catalysts of the present disclosure are suitable for use in any olefin polymerization method, using various types of polymerization reactors. In an aspect of the present disclosure, a polymer of the present disclosure is produced by any olefin polymerization method, using various types of polymerization reactors. As used herein, "polymerization reactor" includes any reactor capable of polymerizing olefin monomers to produce homopolymers and/or copolymers. Homopolymers and/or copolymers produced in the reactor may be referred to as resin and/or polymers. The various types of reactors include, but are not limited to those that may be referred to as batch, slurry, gas-phase, solution, high pressure, tubular, autoclave, or other reactor and/or reactors. Gas phase reactors may comprise fluidized bed reactors or staged horizontal reactors. Slurry reactors may comprise vertical and/or horizontal loops. High pressure reactors may comprise autoclave and/or tubular reactors. Reactor types may include batch and/or continuous processes. Continuous processes may use intermittent and/or continuous product discharge or transfer. Processes may also include partial or full direct recycle of un-reacted monomer, un-reacted comonomer, catalyst and/or co-catalysts, diluents, and/or other materials of the polymerization process.

Polymerization reactor systems of the present disclosure may comprise one type of reactor in a system or multiple reactors of the same or different type, operated in any suitable configuration. Production of polymers in multiple reactors may include several stages in at least two separate polymerization reactors interconnected by a transfer system making it possible to transfer the polymers resulting from the first polymerization reactor into the second reactor. Alternatively, polymerization in multiple reactors may include the transfer, either manual or automatic, of polymer from one reactor to subsequent reactor or reactors for additional polymerization. Alternatively, multi-stage or multi-step polymerization may take place in a single reactor, wherein the conditions are changed such that a different polymerization reaction takes place.

The desired polymerization conditions in one of the reactors may be the same as or different from the operating conditions of any other reactors involved in the overall process of producing the polymer of the present disclosure. Multiple reactor systems may include any combination including, but not limited to multiple loop reactors, multiple gas phase reactors, a combination of loop and gas phase reactors, multiple high pressure reactors or a combination of high pressure with loop and/or gas reactors. The multiple reactors may be operated in series or in parallel. In an aspect of the present disclosure, any arrangement and/or any combination of reactors may be employed to produce the polymer of the present disclosure.

According to one aspect of the present disclosure, the polymerization reactor system may comprise at least one loop slurry reactor. Such reactors are commonplace, and may comprise vertical or horizontal loops. Monomer, diluent, catalyst system, and optionally any comonomer may be continuously fed to a loop slurry reactor, where polymerization occurs. Generally, continuous processes may comprise the continuous introduction of a monomer, a catalyst, and/or a diluent into a polymerization reactor and the continuous removal from this reactor of a suspension comprising polymer particles and the diluent. Reactor effluent may be flashed to remove the liquids that comprise the diluent from the solid polymer, monomer and/or comonomer. Various technologies may be used for this separation step including but not limited to, flashing that may include any combination of heat addition and pressure reduction; separation by cyclonic action in either a cyclone or hydrocyclone; separation by centrifugation; or other appropriate method of separation.

Typical slurry polymerization processes (also known as particle-form processes) are disclosed in U.S. Pat. Nos. 3,248,179, 4,501,885, 5,565,175, 5,575,979, 6,239,235, 6,262,191 and 6,833,415, for example; each of which are herein incorporated by reference in their entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another aspect of the present disclosure, the polymerization reactor may comprise at least one gas phase reactor. Such systems may employ a continuous recycle stream containing one or more monomers continuously cycled through a fluidized bed in the presence of the catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas phase reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 4,588,790, 5,352,749, and 5,436,304, each of which is incorporated by reference in its entirety herein.

According to still another aspect of the present disclosure, a high pressure polymerization reactor may comprise a tubular reactor or an autoclave reactor. Tubular reactors may have several zones where fresh monomer, initiators, or catalysts are added. Monomer may be entrained in an inert gaseous stream and introduced at one zone of the reactor. Initiators, catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

According to yet another aspect of the present disclosure, the polymerization reactor may comprise a solution polymerization reactor wherein the monomer is contacted with the catalyst composition by suitable stirring or other means. A carrier comprising an organic diluent or excess monomer may be employed. If desired, the monomer may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization.

Polymerization reactors suitable for the present disclosure may further comprise any combination of at least one raw material feed system, at least one feed system for catalyst or catalyst components, and/or at least one polymer recovery system. Suitable reactor systems for the present invention may further comprise systems for feedstock purification, catalyst storage and preparation, extrusion, reactor cooling, polymer recovery, fractionation, recycle, storage, loadout, laboratory analysis, and process control.

Conditions that are controlled for polymerization efficiency and to provide polymer properties include, but are not limited to temperature, pressure, type and quantity of catalyst or co-catalyst, and the concentrations of various reactants. Polymerization temperature can affect catalyst productivity, polymer molecular weight and molecular weight distribution. Suitable polymerization temperatures may be any temperature below the de-polymerization temperature, according to the Gibbs Free Energy Equation. Typically, this includes from about 60° C. to about 280° C., for example, and/or from about 70° C. to about 110° C., depending upon the type of polymerization reactor and/or polymerization process.

Suitable pressures will also vary according to the reactor and polymerization process. The pressure for liquid phase polymerization in a loop reactor is typically less than 1000 psig (6.9 MPa). Pressure for gas phase polymerization is usually at about 200 psig (1.4 MPa)-500 psig (3.45 MPa). High pressure polymerization in tubular or autoclave reactors is generally run at about 20,000 psig (138 MPa); to 75,000 psig (518 MPa). Polymerization reactors can also be operated in a supercritical region occurring at generally higher temperatures and pressures. Operation above the critical point of a pressure/temperature diagram (supercritical phase) may offer advantages.

The concentration of various reactants can be controlled to produce polymers with certain physical and mechanical properties. The proposed end-use product that will be formed by the polymer and the method of forming that product may be varied to determine the desired final product properties. Mechanical properties include, but are not limited to tensile strength, flexural modulus, impact resistance, creep, stress relaxation and hardness tests. Physical properties include, but are not limited to density, molecular weight, molecular weight distribution, melting temperature, glass transition temperature, temperature melt of crystallization, density, stereoregularity, crack growth, short chain branching, long chain branching and rheological measurements.

The concentrations of monomer, co-monomer, hydrogen, co-catalyst, modifiers, and electron donors are generally important in producing specific polymer properties. Comonomer may be used to control product density. Hydrogen may be used to control product molecular weight. Co-catalysts may be used to alkylate, scavenge poisons and/or control molecular weight. The concentration of poisons may be minimized, as poisons may impact the reactions and/or otherwise affect polymer product properties. Modifiers may be used to control product properties and electron donors may affect stereoregularity.

Polymers such as polyethylene homopolymers and copolymers of ethylene with other mono-olefins may be produced in the manner described above using the polymerization catalysts prepared as described herein. Polymers produced as disclosed herein may be formed into articles of manufacture or end use articles using techniques known in the art such as extrusion, blow molding, injection molding, fiber spinning, thermoforming, and casting. For example, a polymer resin may be extruded into a sheet, which is then thermoformed into an end use article such as a container, a cup, a tray, a pallet, a toy, or a component of another product. Examples of other end use articles into which the polymer resins may be formed include pipes, films, and bottles.

In an aspect of the present disclosure, an olefin polymerization catalyst of the type described herein may be used to prepare polyethylene. The PE prepared as described herein may be characterized by a melt index, MI, ranging from about 0 g/10 min. to about 10 g/10 min., alternatively from about 0.1 g/10 min. to about 5 g/10 min., or alternatively from about 0.2 g/10 min. to about 2 g/10 min. The melt index (MI) refers to the amount of a polymer which can be forced through an extrusion rheometer orifice of 0.0825 inch diameter when subjected to a force of 2,160 grams in ten minutes at 190° C., as determined in accordance with ASTM D1238.

Further, the PE may be characterized by a high load melt index, HLMI, ranging from about 1 g/10 min. to about 1000 g/10 min., alternatively from about 3 g/10 min. to about 300 g/10 min., from about 10 g/10 min. to about 100 g/10 min, or alternatively from about 10 g/10 min to about 60 g/10 min. The HLMI represents the rate of flow of a molten polymer through an orifice of 0.0825 inch diameter when subjected to a force of 21,600 grams at 190° C. as determined in accordance with ASTM D1238.

In an aspect of the present disclosure, the PE may be characterized by a shear response ranging from about 30 to about 1000, alternatively from about 30 to about 200, less than 60, or less than 45 or alternatively less than 40. The shear response refers to the ratio of high load melt index to melt index (HLMI/MI).

Catalysts of the present disclosure tend to produce a polymer having a broad molecular weight distribution, as indicated by the polydispersity index which is the result of weight-average molecular weight ($M_w$) divided by number-average molecular weight ($M_n$). $M_w$ describes the molecular weight distribution of a polymer and is calculated according to Equation 1:

$$M_w = \frac{\sum_i N_i M_i^2}{\sum_i N_i M_i} \quad (1)$$

where $N_i$ is the number of molecules of molecular weight $M_i$.

$M_n$ is the common average of the molecular weights of the individual resins and may be calculated according to Equation 2:

$$M_n = \frac{\sum_i N_i M_i}{\sum_i N_i} \quad (2)$$

where $N_i$ is the number of molecules of molecular weight $M_i$. A polymer (e.g., polyethylene) prepared as disclosed herein may be characterized by a polydispersity index of from about 10 to about 30, alternatively from about 12 to about 25, alternatively from about 15 to about 25, or alternatively greater than about 15.

EXAMPLES

The following examples are given as particular aspect of the present disclosures of the present disclosure and to demonstrate the practice and advantages thereof. It is understood that the examples are given by way of illustration and are not intended to limit the specification or the claims to follow in any manner.

Olefin polymerization catalysts of the type disclosed herein were prepared as follows: 7.3 grams of HA30W was weighed into a beaker. HA30W is a commercial Cr/silica material obtained from W.R. Grace, having a surface area of about 500 m$^2$/gram, a pore volume of about 1.6 mL/g, an average particle size of about 90 microns, and containing 1 wt. % Cr and about 8 wt. % moisture. 2.3 grams of titanium oxide acetylacetonate, that is TiO(AcAc)$_2$, was then dissolved into 150 mL of wet methanol (i.e., methanol which had not been specifically dried). The Ti compound dissolved to make a yellow solution. Then the HA30W was added to the solution and the methanol was boiled away in a vacuum oven set at 100° C. Afterward the solid catalyst was calcined by fluidization in dry air for three hours at 650° C. It was then stored in an air-tight container under dry nitrogen until it was tested in a polymerization test.

In another experiment, 4.08 grams of ammonium titanyl oxylate, that is (NH$_4$)$_2$TiO(C$_2$O$_4$)$_2$*1H$_2$O, was dissolved in 40 mL of deionized water. 13.3 grams of HA30W catalyst was then added to this solution to make a wet paste. It was placed in a vacuum oven at 100° C. overnight, yielding a light blue dry material. Finally, the material was calcined as described above at 650° C. to produce the orange-colored polymerization catalyst.

Melt index (MI, g/10 min) was determined in accordance with ASTM D1238 at 190° C. with a 2,160 gram weight. I$_{10}$ (g/10 min) is the polymer flow rate using a 10 kg weight. The high load melt index (HLMI) of a polymer resin represents the rate of flow of a molten resin through an orifice of 0.0825 inch diameter when subjected to a force of 21,600 grams at 190° C. The HLMI values are determined in accordance with ASTM D1238 condition E.

Polymerization tests were conducted in a 2.2 liter stainless-steel reactor equipped with a marine stirrer rotating at 500 rpm. The reactor was surrounded by a steel jacket, through which a mixture of cold water and steam was passed to precisely control the temperature to within half a degree centigrade, with the help of electronic control instruments.

Unless otherwise stated, a small amount (0.01 to 0.10 grams normally) of the solid catalyst was first charged under nitrogen to the dry reactor. Next 1.2 liter of isobutane liquid was charged and the reactor and heated up to the 105° C. Finally ethylene was added to the reactor to maintain a fixed pressure, 550 psig, during the experiment. The stirring was allowed to continue for the specified time, usually around one hour, and the activity was noted by recording the flow of ethylene into the reactor to maintain the set pressure.

After the allotted time, the ethylene flow was stopped and the reactor slowly depressurized and opened to recover a granular polymer powder, which was weighed. In all cases the reactor was clean with no indication of any wall scale, coating or other forms of fouling. The polymer powder was then removed and weighed. Activity was specified as grams of polymer produced per gram of solid catalyst charged per hour.

Example 1

The results of polymerization runs using an olefin polymerization catalyst of the type disclosed herein are shown in Table 1. The table lists which titanium compound was used, the run conditions, and several polymer properties, including melt index, high load melt index, and the polydispersity.

TABLE 1

| Run # | Oxotitanium Compound | Solvent | Run Temp. (°C.) | Hexene (ml) | Productivity g PE/g catalyst | Activity (g PE/g cat/h) | HLMI g/10 min | $I_{10}$ g/10 min | MI g/10 min | $M_w/M_n$ |
|---|---|---|---|---|---|---|---|---|---|---|
| 1 | TiO(oxylate)$_2$ | Water | 105 | 0 | 3252 | 2710 | 10.1 | 1.98 | 0.055 | 18.7 |
| 2 | TiO(AcAc)$_2$ | MeOH | 105 | 5 | 1957 | 3670 | 49.4 | 12.68 | 1.52 | 14.5 |
| 3 | TiO(AcAc)$_2$ | MeOH | 105 | 5 | 3065 | 6567 | 24.7 | 5.90 | 0.51 | 17.3 |
| 4 | TiO(AcAc)$_2$ | MeOH | 105 | 5 | 3571 | 5790 | 18.9 | 4.55 | 0.32 | 16.5 |
| 5 | TiO(AcAc)$_2$ | MeOH | 105 | 5 | 3485 | 6151 | 20.3 | 5.09 | 0.56 | 18.3 |
| 6 | TiO(AcAc)$_2$ | MeOH | 105 | 5 | 3268 | 7262 | 20.3 | 5.13 | 0.47 | 15.6 |
| 7 | None | None | 105 | 0 | 2973 | 2973 | 5.5 | 0.87 | 0 | 17.5 |

The results demonstrate the olefin polymerization catalyst of the present disclosure was effective at raising the polymer melt index and displayed higher catalyst activity when compared to the use of a chrominated support as an olefin polymerization catalyst (i.e., control run #7).

Example 2

Emissions of HRVOC during preparation of an olefin polymerization catalyst of the type disclosed herein was investigated and compared to emissions observed when preparing an olefin polymerization catalyst utilizing a non-oxo titanium compound. The results of these experiments, the percent carbon emission and ratio of oxygen/carbon (O/C), are presented in Table 2.

TABLE 2

| Run # | Titanium Compound | Molecular weight g/mol | % C | O/C |
|---|---|---|---|---|
| A | Tioxo(AcAc)$_2$ | 262 | 16 | 2.5 |
| B | Tioxo(oxylate)$_2$ | 152 | 46 | 0.5 |
| C | Ti(isopropoxide)$_4$ | 284 | 51 | 0.33 |

As would be understood by one of ordinary skill in the art, the more carbons present in the titanium compound, the more emissions are expected during calcination to activate the catalyst. This is observable for the Tioxo(AcAc)$_2$ and Tioxo(oxylate)$_2$ which have less % carbon than the control (i.e., Ti(isopropoxide)$_4$). Further, given the oxygen to carbon ratio (O/C) for the oxo compounds, pyrolysis would result in the carbon being released as $CO_2$ or CO as opposed to the production of propylene observed when the control compound is pyrolyzed.

Figure 1:
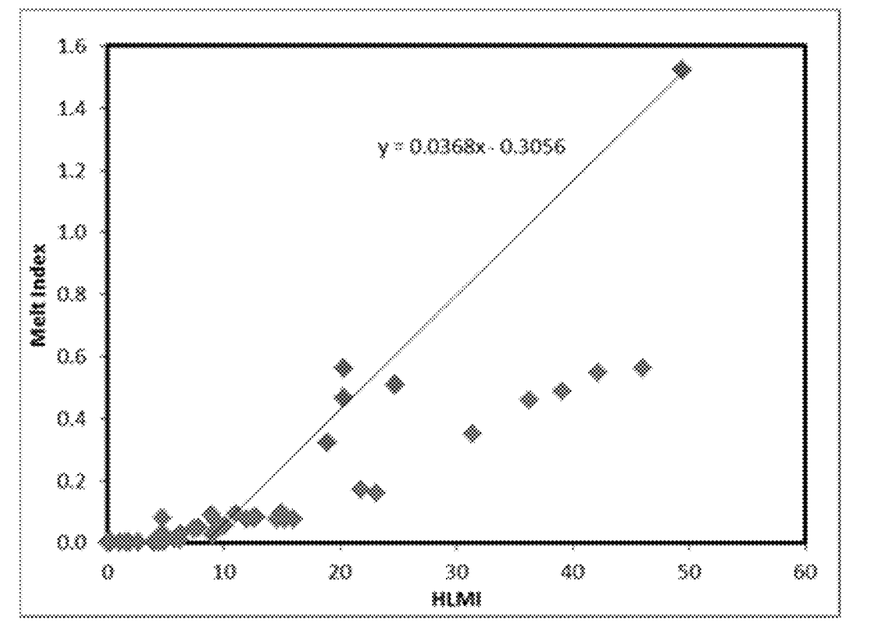
FIG. 1 is a plot of the shear response of polyethylene resins from example 3.

Shear response, that is HLMI/MI, can also be calculated from the values in Table 1. It is interesting that the shear response values from the Ti-oxo catalysts in Table 1 are considerably lower than is normal for these broad MW distribution polymers. FIG. 1 makes this point, showing a plot of the MI as a function of HLMI. Runs utilizing catalysts of the present disclosure from Table 1 are plotted here along with a multitude of other polymers made from the same Cr/silica catalyst, but using other titanium compounds, mostly titanium tetra-isopropoxide. Notice that the inventive runs stand out as having a higher MI for a given HLMI. In other words the inventive catalysts produce a lower shear response, even though all catalysts were calcined at 650° C. and tested under the same polymerization conditions. The results demonstrate that polymers prepared using an olefin polymerization catalyst of the type disclosed herein have a narrow ratio of HLMI/MI (i.e., shear response) when compared to polymers prepared using non-oxo titanium compounds. This attribute is useful in the production of film resins.

Additional Disclosure

The following enumerated aspects of the present disclosures are provided as non-limiting examples.

A first aspect which is a method of preparing a catalyst comprising: a) contacting (i) a silica-support, (ii) an oxotitanium compound, (iii) a chromium-containing compound, and (iv) an optional solvent to form a first aqueous mixture comprising a pre-catalyst and a reaction media having from about 1 wt. % to about 99 wt. % water; and b) thermally treating the pre-catalyst by heating to a temperature of from about 400° C. to about 1000° C. for a time period of from about 1 minute to about 24 hours to form the catalyst.

A second aspect which is the method of the first aspect wherein the reaction media comprises from about 1 wt. % to about 20 wt. % water.

A third aspect which is the method of any of the first through second aspects wherein the reaction media comprises a liquid associated with the silica-support, a liquid associated with the oxotitanium compound, a liquid associated with the chromium-containing compound, and, when present, the solvent.

A fourth aspect which is the method of any of the first through third aspects wherein the silica-support is characterized by a surface area of from about 100 m$^2$/gram to about 1000 m$^2$/gram and a pore volume of greater than about 1.0 cm$^3$/gram.

A fifth aspect which is the method of any of the first through fourth aspects wherein the chromium-containing compound comprises chromium trioxide, chromium acetate, chromium nitrate, tertiary butyl chromate, a diarene chromium (0) compound, biscyclopentadienyl chromium(II), chromium (III) acetylacetonate, or combinations thereof.

A sixth aspect which is the method of any of the first through fifth aspects wherein an amount of chromium present in the olefin polymerization catalyst may range from about 0.01% to about 10% by weight of the olefin polymerization catalyst and an amount of titanium present in the olefin polymerization catalyst may range from about 0.01% to about 10% by weight of the olefin polymerization catalyst.

A seventh aspect which is the method of any of the first through sixth aspects wherein the pre-catalyst excludes a titanium tetraalkoxide.

An eighth aspect which is the method of any of the first through seventh aspects wherein the oxotitanium compound is characterized by the general formula $R^1R^2TiO$ wherein $R^1$ and $R^2$ are each independently a carboxylate, a dicarboxylate, a diketonate, an alkoxide, an ammonium salt of a dicarboxylate, an ammonium salt of a tricarboxylate or combinations thereof.

A ninth aspect which is the method of the eighth aspect wherein $R^1$ and $R^2$ are each independently formate, acetate, propionate, ammonium oxalate, ammonium malonate, ammonium fumarate, or ammonium malate.

A tenth aspect which is the method of the eighth aspect wherein $R^1$ and $R^2$ are each independently unsubstituted 2,4-pentadionate or substituted 2,4-pentadionate.

An eleventh aspect which is the method of any of the first through tenth aspects further comprising contacting the catalyst with an ethylene monomer under conditions.

A twelfth aspect which is the polymer of the eleventh aspect having a high load melt index of from about 10 g/10 min. and to about 60 g/10 min, a polydispersity index of greater than about 15 and a shear response of less than about 60.

A thirteenth aspect which is the polymer of the eleventh aspect having a high load melt index of from about 10 g/10 min to about 60 g/10 min, a polydispersity index of greater than about 15 and a shear response of less than about 45.

A fourteenth aspect which is a method of preparing a catalyst comprising contacting a hydrated support material comprising silica with a chromium-containing compound to form a first aqueous mixture comprising a chromated support; contacting the first aqueous mixture comprising a chromated support with a solution comprising (i) a solvent and (ii) an oxotitanium compound to form a second aqueous mixture comprising a pre-catalyst; and thermally treating the pre-catalyst to form the catalyst.

A fifteenth aspect which is the method of the fourteenth aspect wherein the first aqueous mixture comprises a liquid associated with the hydrated support material comprising silica and a liquid associated with the chromium-containing compound and wherein the second aqueous mixture comprises a liquid associated with the hydrated support material comprising silica, a liquid associated with the chromium-containing compound, a liquid associated with the oxotitanium compound, and the solvent.

A sixteenth aspect which is the method of any of the fourteenth through fifteenth aspects wherein an amount of water present in the first or second aqueous mixture is in a range of from about 1 wt. % to about 50 wt. % of the total weight of the pre-catalyst.

A seventeenth aspect which is the method of any of the fourteenth through sixteenth aspects wherein the chromium-containing compound comprises chromium trioxide, chromium acetate, chromium nitrate, tertiary butyl chromate, a diarene chromium (0) compound, biscyclopentadienyl chromium(II), chromium (III) acetylacetonate, or combinations thereof.

An eighteenth aspect which is the method of any of the fourteenth through seventeenth aspects wherein the oxotitanium compound is characterized by the general formula $R^1R^2TiO$ wherein $R^1$ and $R^2$ are each independently a carboxylate, an alkoxide, an ammonium salt of a dicarboxylate, an ammonium salt of a tricarboxylate or combinations thereof.

A nineteenth aspect which is the method of the eighteenth aspect wherein $R^1$ and $R^2$ are each independently formate, acetate, propionate, ammonium oxalate, ammonium malonate, ammonium fumarate, or ammonium malate.

A twentieth aspect which is the method of the eighteenth aspect wherein $R^1$ and $R^2$ are each independently unsubstituted 2,4-pentadionate or substituted 2,4-pentadionate.

A twenty-first aspect which is a method of preparing a catalyst comprising contacting a hydrated support material comprising silica with an oxotitanium compound to form a first aqueous mixture comprising a titanated support; contacting the first aqueous mixture comprising a titanated support with a chromium-containing compound to form a second aqueous mixture comprising a pre-catalyst, and thermally treating the pre-catalyst to form the catalyst.

A twenty-second aspect which is a method of preparing a catalyst comprising a) contacting (i) a silica support material comprising from about 0.1 wt. % to about 20 wt. % water, (ii) a solution comprising (1) a 2,4-pentadionate oxotitanium compound, (2) a solvent and (3) from about 0.1 wt. % to about 80 wt. % water based on the total weight of the solution and (iii) a chromium-containing compound to from a pre-catalyst wherein liquid present in (i), (ii), and (iii) comprise a reaction media; and b) thermally treating the pre-catalyst by heating to a temperature in the range of from about 500° C. to about 900° C. for a time period of from about 3 hours to about 12 hours to form a catalyst.

A twenty-third aspect which is the method of the twenty-second aspect wherein thermally treating the pre-catalyst produces emission products comprising less than about 2 wt. % hydrocarbons based on a total weight of the emission products.

A twenty-fourth aspect which is a pre-catalyst composition comprising: (i) a silica-support (ii) an oxotitanium compound characterized by the general formula $R^1R^2TiO$ wherein $R^1$ and $R^2$ are each independently a carboxylate, a dicarboxylate, a diketonate, an alkoxide, an ammonium salt of a dicarboxylate, an ammonium salt of a tricarboxylate or combinations thereof and (iii) a chromium-containing compound.

A twenty-fifth aspect which is the composition of the twenty-fourth aspect wherein titanium is present in an amount of from about 0.5 wt. % to about 10 wt. % and chromium is present in an amount of from about 0.2 wt. % to about 2 wt. % based on the total weight of the composition.

A twenty-sixth aspect which is the composition of any of the twenty-fourth through twenty-fifth aspects wherein the silica support is characterized by a surface area of greater than about 250 $m^2/g$ and a pore volume of greater than about 0.9 $cm^3/g$.

A twenty-seventh aspect which is a pre-catalyst prepared by contacting (i) a silica-support, (ii) an oxotitanium compound, (iii) a chromium-containing compound, and (iv) an optional solvent to form a first aqueous mixture comprising the pre-catalyst and a reaction media having from about 1 wt. % to about 99 wt. % water.

A twenty-eighth aspect which is the pre-catalyst of the twenty-seventh aspect wherein titanium is present in an amount of from about 0.5 wt. % to about 10 wt. % and chromium is present in an amount of from about 0.2 wt. % to about 2 wt. % based on the total weight of the composition.

A twenty-ninth aspect which is the pre-catalyst of any of the twenty-seventh through twenty-eighth aspects wherein the silica support is characterized by a surface area of greater than about 250 $m^2/g$ and a pore volume of greater than about 0.9 $cm^3/g$.

A thirtieth aspect which is the method of any of the twenty-seventh through twenty-ninth aspects wherein the oxotitanium compounds have a carbon:oxygen ratio of equal to or greater than about 0.5.

A thirty-first aspect which is a method of preparing a catalyst comprising contacting a hydrated support material comprising silica with a chromium-containing compound to form a chrominated support, wherein the hydrated support material contains from about 1 wt. % to about 20 wt. % water based on the weight of the support material and wherein the chromium-containing compound is in an water or an alcohol, contacting the chrominated support with a solution comprising (i) a solvent selected from the group consisting of water or a $C_1$-$C_4$ alcohol and (ii) an oxotitanium compound to form a pre-catalyst, wherein the oxotitanium compound characterized by the general formula $R^1R^2TiO$ wherein $R^1$ and $R^2$ are each independently a carboxylate, a dicarboxylate, a diketonate, an alkoxide, an ammonium salt of a dicarboxylate, an ammonium salt of a tricarboxylate or combinations thereof and wherein the titanated pre-catalyst mixture comprises from about 1 wt. % to about 99 wt. % water; and thermally treating the pre-catalyst by heating to a temperature in the range of from about 500° C. to about 900° C. for a time period of from about 1 minute to about 24 hours to form a catalyst.

A thirty-second aspect which is a method of preparing a catalyst comprising contacting a hydrated support material comprising silica with a chromium-containing compound to form a first aqueous mixture comprising a chrominated support; contacting the first aqueous mixture comprising a chrominated support with an oxotitanium compound to form a second aqueous mixture comprising a pre-catalyst; and thermally treating the pre-catalyst to form the catalyst.

A thirty-third aspect which is the method of the thirty-second aspect wherein the first aqueous mixture comprises a liquid associated with the hydrated support material comprising silica, a liquid associated with the chromium-containing compound, and an optional solvent (e.g., non-aqueous solvent), when present.

A thirty-fourth aspect which is the method of any of the thirty-second through thirty-third aspects wherein the second aqueous mixture comprises a liquid associated with the hydrated support material comprising silica, a liquid associated with the chromium-containing compound, a liquid associated with the oxotitanium compound, and an optional solvent (e.g., non-aqueous solvent), when present.

A thirty-fifth aspect which is a method of preparing a catalyst comprising contacting a hydrated support material comprising silica with an oxotitanium compound, optionally in the presence of a first solvent (e.g., water and/or a non-aqueous solvent), to form a first aqueous mixture comprising a titanated support; contacting the first aqueous mixture comprising the titanated support with a chromium-containing compound, optionally in the presence of a second solvent (e.g., water and/or a non-aqueous solvent) to form a second aqueous mixture comprising a pre-catalyst, wherein the first solvent and the second solvent can be the same or different; and thermally treating the pre-catalyst to form the catalyst.

A thirty-sixth aspect which is a method of preparing a catalyst comprising contacting a hydrated support material comprising silica with a solution comprising (i) an oxotitanium compound and (ii) a first solvent (e.g., water and/or a non-aqueous solvent) to form a first aqueous mixture comprising a titanated support, contacting the first aqueous mixture comprising the titanated support with a solution comprising (i) a chromium-containing compound and (ii) a second solvent (e.g., water and/or a non-aqueous solvent) to form a second aqueous mixture comprising a pre-catalyst, wherein the first solvent and the second solvent can be the same or different; and thermally treating the pre-catalyst to form the catalyst.

A thirty-seventh aspect which is a pre-catalyst prepared by contacting (i) a silica-support, (ii) an oxotitanium compound, (iii) a chromium-containing compound, and (iv) an optional solvent to form a first aqueous mixture comprising the pre-catalyst and a reaction media having from about 1 wt. % to about 99 wt. % water.

A thirty-eighth aspect which is the pre-catalyst of the thirty-seventh aspect wherein titanium is present in an amount of from about 0.5 wt. % to about 10 wt. % and chromium is present in an amount of from about 0.2 wt. % to about 2 wt. % based on the total weight of the composition.

A thirty-ninth aspect which is the pre-catalyst of any of the thirty-seventh through thirty-eighth aspects wherein the silica support is characterized by a surface area of greater than about 250 $m^2/g$ and a pore volume greater than about 0.9 $cm^3/g$.

While various aspects of the present disclosures have been shown and described, modifications thereof can be made by one skilled in the art without departing from the spirit and teachings of the invention. The aspects of the present disclosures described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an aspect of the present disclosure of the present invention. Thus, the claims are a further description and are an addition to the aspect of the present disclosures of the present disclosure. The discussion of a reference in the present disclosure is not an admission that it is prior art to the present disclosure, especially any reference that may have a publication date after the priority date of this application. The present disclosures of all patents, patent applications, and publications cited herein are hereby incorporated by reference, to the extent that they provide exemplary, procedural or other details supplementary to those set forth herein.

What is claimed is:

1. A method of preparing a catalyst comprising:
   a) contacting (i) a silica-support, (ii) an oxotitanium compound, (iii) a chromium-containing compound, and (iv) an optional solvent to form a first aqueous mixture comprising a pre-catalyst and a reaction media wherein the reaction media comprises from about 1 wt. % to about 20 wt. % water; and
   b) thermally treating the pre-catalyst by heating to a temperature of from about 400° C. to about 1000° C. for a time period of from about 1 minute to about 24 hours to form the catalyst.

2. The method of claim 1 wherein the reaction media comprises a liquid associated with the silica-support, a liquid associated with the oxotitanium compound, a liquid associated with the chromium-containing compound, and, when present, the solvent.

3. The method of claim 1 wherein the silica-support is characterized by a surface area of from about 100 m$^2$/gram to about 1000 m$^2$/gram and a pore volume of greater than about 1.0 cm$^3$/gram.

4. The method of claim 1 wherein the chromium-containing compound comprises chromium trioxide, chromium acetate, chromium nitrate, tertiary butyl chromate, a diarene chromium (0) compound, biscyclopentadienyl chromium (II), chromium (III) acetylacetonate, or combinations thereof.

5. The method of claim 1 wherein an amount of chromium present in the catalyst ranges from about 0.01% to about 10% by weight of the catalyst and an amount of titanium present in the catalyst ranges from about 0.01% to about 10% by weight of the catalyst.

6. The method of claim 1 wherein the reaction mixture excludes a titanium tetraalkoxide.

7. A method of preparing a catalyst comprising:
   a) contacting (i) a silica-support, (ii) an oxotitanium compound characterized by a general formula R$^1$R$^2$TiO wherein R$^1$ and R$^2$ are each independently a carboxylate, a dicarboxylate, a diketonate, an alkoxide, an ammonium salt of a dicarboxylate, an ammonium salt of a tricarboxylate or combinations thereof, (iii) a chromium-containing compound, and (iv) an optional solvent to form a first aqueous mixture comprising a pre-catalyst and a reaction media having from about 1 wt. % to about 99 wt. % water; and
   b) thermally treating the pre-catalyst by heating to a temperature of from about 400° C. to about 1000° C. for a time period of from about 1 minute to about 24 hours to form the catalyst.

8. The method of claim 7 wherein R$^1$ and R$^2$ are each independently formate, acetate, propionate, ammonium oxalate, ammonium malonate, ammonium fumarate, or ammonium malate.

9. The method of claim 7 wherein R$^1$ and R$^2$ are each independently unsubstituted 2,4-pentadionate or substituted 2,4-pentadionate.

10. A method of preparing a polymer comprising contacting a catalyst prepared by the method of claim 1 with an ethylene monomer under conditions suitable for formation of an ethylene polymer; and recovering the polymer.

11. The method of claim 10 wherein the polymer has a high load melt index of from about 10 g/10 min and to about 60 g/10 min, a polydispersity index of greater than about 15 and a shear response of less than about 60.

12. The method of claim 10 wherein the polymer has a high load melt index of from about 10 g/10 min to about 60 g/10 min, a polydispersity index of greater than about 15 and a shear response of less than about 45.

13. A method of preparing a catalyst comprising:
   contacting a hydrated support material comprising silica with a chromium-containing compound to form a first aqueous mixture comprising a chrominated support;
   contacting the first aqueous mixture comprising a chrominated support with a solution comprising (i) a solvent and (ii) an oxotitanium compound to form a second aqueous mixture comprising a pre-catalyst, wherein the oxotitanium compound is characterized by a general formula R$^1$R$^2$TiO wherein R$^1$ and R$^2$ are each independently a carboxylate, an alkoxide, an ammonium salt of a dicarboxylate, an ammonium salt of a tricarboxylate or combinations thereof; and
   thermally treating the pre-catalyst to form the catalyst.

14. The method of claim 13 wherein the first aqueous mixture comprises a liquid associated with the hydrated support material comprising silica and a liquid associated with the chromium-containing compound and wherein the second aqueous mixture comprises a liquid associated with the hydrated support material comprising silica, a liquid associated with the chromium-containing compound, a liquid associated with the oxotitanium compound, and the solvent.

15. The method of claim 13 wherein an amount of water present in the first or second aqueous mixture is in a range of from about 1 wt. % to about 50 wt. %.

16. The method of claim 13 wherein the chromium-containing compound comprises chromium trioxide, chromium acetate, chromium nitrate, tertiary butyl chromate, a diarene chromium (0) compound, biscyclopentadienyl chromium(II), chromium (III) acetylacetonate, or combinations thereof.

17. The method of claim 13 wherein R$^1$ and R$^2$ are each independently formate, acetate, propionate, ammonium oxalate, ammonium malonate, ammonium fumarate, or ammonium malate.

18. The method of claim 13 wherein R$^1$ and R$^2$ are each independently unsubstituted 2,4-pentadionate or substituted 2,4-pentadionate.

19. A method of preparing a catalyst comprising:
   contacting a hydrated support material comprising silica with an oxotitanium compound to form a first aqueous mixture comprising a titanated support and a first reaction media wherein the first reaction media comprises from about 1 wt. % to about 20 wt. % water;

contacting the first aqueous mixture comprising a titanated support with a chromium-containing compound to form a second aqueous mixture comprising a pre-catalyst and a second reaction media wherein the second reaction media comprises from about 1 wt. % to about 20 wt. % water; and thermally treating the pre-catalyst to form the catalyst.

20. A method of preparing a catalyst comprising:
a) contacting (i) a silica support material comprising from about 0.1 wt. % to about 20 wt. % water, (ii) a solution comprising (1) a 2,4-pentadionate oxotitanium compound, (2) a solvent and (3) from about 0.1 wt. % to about 80 wt. % water based on the total weight of the solution and (iii) a chromium-containing compound to form a pre-catalyst wherein liquid present in (i), (ii), and (iii) comprise a reaction media; and
b) thermally treating the pre-catalyst by heating to a temperature in the range of from about 500° C. to about 900° C. for a time period of from about 3 hours to about 12 hours to form a catalyst.

21. The method of claim 20 wherein thermally treating the pre-catalyst produces emission products comprising less than about 2 wt. % hydrocarbons based on a total weight of the emission products.

22. A pre-catalyst composition comprising: (i) a silica-support, (ii) an oxotitanium compound characterized by the general formula $R^1R^2TiO$ wherein $R^1$ and $R^2$ are each independently a carboxylate, a dicarboxylate, a diketonate, an alkoxide, an ammonium salt of a dicarboxylate, an ammonium salt of a tricarboxylate or combinations thereof, and (iii) a chromium-containing compound.

23. The composition of claim 22 wherein titanium is present in an amount of from about 0.5 wt. % to about 10 wt. % and chromium is present in an amount of from about 0.2 wt. % to about 2 wt. % based on the total weight of the composition.

24. The composition of claim 22 wherein the silica support is characterized by a surface area of greater than about 250 $m^2/g$ and a pore volume of greater than about 0.9 $cm^3/g$.

25. A pre-catalyst prepared by a process comprising contacting (i) a silica-support, (ii) an oxotitanium compound characterized by a general formula $R^1R^2TiO$ wherein $R^1$ and $R^2$ are each independently a carboxylate, a dicarboxylate, a diketonate, an alkoxide, an ammonium salt of a dicarboxylate, an ammonium salt of a tricarboxylate or combinations thereof, (iii) a chromium-containing compound, and (iv) an optional solvent to form a first aqueous mixture comprising the pre-catalyst and a reaction media having from about 1 wt. % to about 99 wt. % water.

26. The pre-catalyst of claim 25 wherein titanium is present in an amount of from about 0.5 wt. % to about 10 wt. % and chromium is present in an amount of from about 0.2 wt. % to about 2 wt. % based on the total weight of the composition and wherein the silica-support is characterized by a surface area of greater than about 250 $m^2/g$ and a pore volume greater than about 0.9 $cm^3/g$.

27. The method of claim 19 wherein an amount of chromium present in the catalyst ranges from about 0.01% to about 10% by weight of the catalyst and an amount of titanium present in the catalyst ranges from about 0.01% to about 10% by weight of the catalyst.

28. The method of claim 19 wherein the oxotitanium compound is characterized by the general formula $R^1R^2TiO$ wherein $R^1$ and $R^2$ are each independently a carboxylate, a dicarboxylate, a diketonate, an alkoxide, an ammonium salt of a dicarboxylate, an ammonium salt of a tricarboxylate or combinations thereof.

29. The method of claim 28 wherein $R^1$ and $R^2$ are each independently unsubstituted 2,4-pentadionate or substituted 2,4-pentadionate.

* * * * *